(12) United States Patent
Moffitt, Jr. et al.

(10) Patent No.: US 6,202,518 B1
(45) Date of Patent: *Mar. 20, 2001

(54) FLOATING, NON-CONDUCTIVE HAND TOOLS

(76) Inventors: Frank A. Moffitt, Jr., 15502 Galveston Rd., Suite 502, Webster, TX (US) 77598; Allan K. Groseth, Rte. 6, Box 6537A, Brazoria, TX (US) 77422

( * ) Notice: Subject to any disclaimer, the term of this patent is extended or adjusted under 35 U.S.C. 154(b) by 0 days.

This patent is subject to a terminal disclaimer.

(21) Appl. No.: 09/241,747

(22) Filed: Feb. 1, 1999

Related U.S. Application Data

(63) Continuation-in-part of application No. 08/722,807, filed on Sep. 27, 1996, now Pat. No. 5,865,077.

(51) Int. Cl.[7] .................................................. B25B 7/00
(52) U.S. Cl. ............................... 81/427.5; 81/418; 81/436
(58) Field of Search .............................. 81/427.5, 177.1, 81/489, 418, 106, 128

(56) References Cited

U.S. PATENT DOCUMENTS

| 3,881,377 | * | 5/1975 | Evans et al. | 81/186 |
|---|---|---|---|---|
| 4,023,450 | | 5/1977 | Ygfors . | |
| 4,185,523 | | 1/1980 | Kreitz . | |
| 4,282,783 | * | 8/1981 | Fortune | 81/428 R |
| 4,377,954 | * | 3/1983 | Schulze | 81/9.5 A |
| 4,651,598 | | 3/1987 | Warheit . | |
| 5,060,543 | | 10/1991 | Warheit . | |
| 5,257,558 | * | 11/1993 | Farzin-Nia et al. | 81/418 |
| 5,351,584 | | 10/1994 | Warheit . | |
| 5,359,911 | * | 11/1994 | Kruesi | 81/436 |
| 5,865,077 | * | 2/1999 | Moffitt, Jr. et al. | 81/427.5 |

* cited by examiner

*Primary Examiner*—David A. Scherbel
*Assistant Examiner*—Lee Wilson
(74) *Attorney, Agent, or Firm*—Sheridan Ross P.C.

(57) ABSTRACT

A floating, non-conductive hand tool such as pliers or channel locks for use by those working proximate to water or an electrical source. The tools are extremely durable, lightweight, and have an internal cavity capable of holding a gas or a light weight polymer foam material to substantially reduce the overall density of the hand tool. Alternatively, the handle ends of the tool may be encased with a low density sheathing material used either independently or in conjunction with the aforementioned internal cavity to reduce the density of the tool.

20 Claims, 4 Drawing Sheets

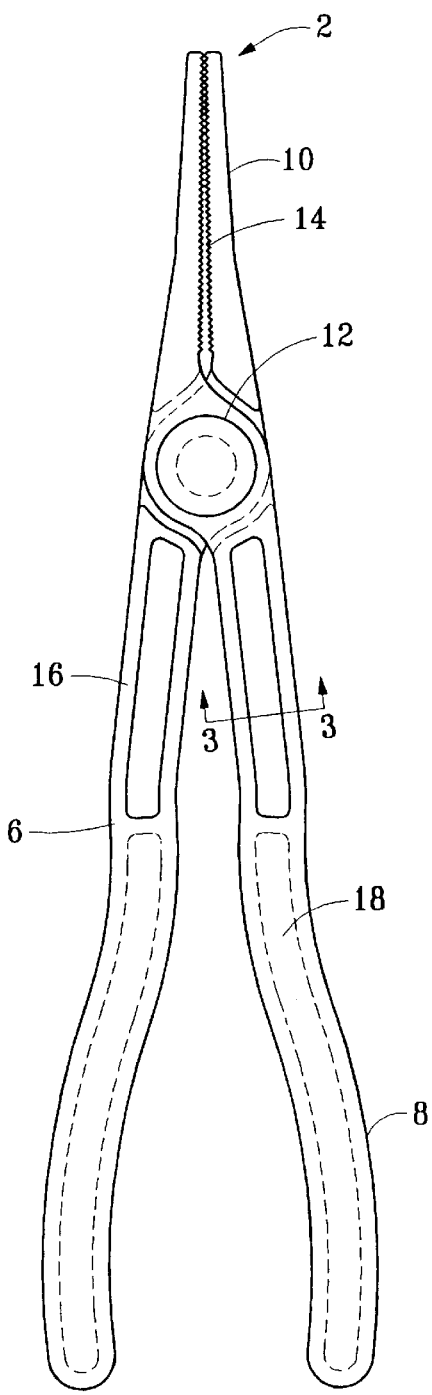
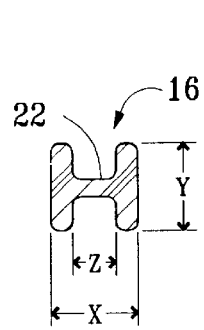
FIG. 3
FIG. 1
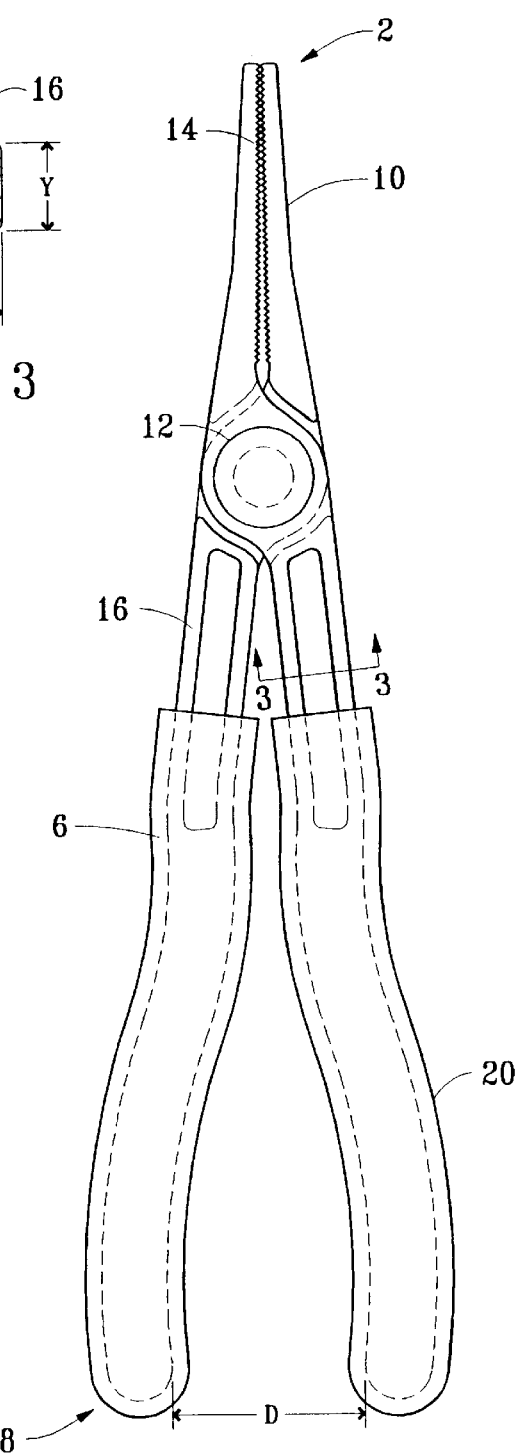
FIG. 2

FLOATING, NON-CONDUCTIVE HAND TOOLS

This application is a Continuation-In-Part application of U.S. patent application Ser. No. 08/722,807 filed Sep. 27, 1996, now U.S. Pat. No. 5,865,077, the application being incorporated herein by reference in its entirety.

FIELD OF THE INVENTION

The present invention relates to lightweight, non- conductive hand tools and more specifically pliers for use by fishermen, electricians and others working near water or an electrical source. The pliers are constructed of a durable plastic, fiberglass or Verton®-type material which provides exceptional strength and durability. The tools have a low density as a result of a gas or foam filled cavity located within a handle portion of the tool, or alternatively by the attachment of a low density foam material positioned around the gripping portion of the tool.

BACKGROUND OF THE INVENTION

Hand held tools such as pliers, channel locks and screwdrivers are commonly used by carpenters, electricians, fishermen, mechanics and homeowners. Unfortunately, these types of tools are generally constructed of a metal material such as steel and may or may not include some form of insulated handle or covering made of a non-conductive material such as plastic or rubber. Thus, when used around any type of electrical source, the tools are capable of conducting electricity and causing severe electrical shock or electrocution.

Furthermore, for fishermen, offshore oil workers and others working or enjoying recreational activities around water, whenever these expensive tools are inadvertently dropped into water, they quickly sink and are rarely retrieved. Additionally, metal tools often rust or corrode when used near water or in locations of high humidity. Although plastic hand held fishing pliers, such as those found in U.S. Pat. No. 4,185,523 have previously been developed, these pliers lack the durability and strength required to be used in industrial applications. Furthermore, the plastic pliers float only as a result of a burdensome styrofoam material positioned between the handle portions of the pliers.

SUMMARY OF THE INVENTION

It is therefore an object of the present invention to provide lightweight, non-conductive, non-corrosive hand tools such as pliers, channel locks, and screwdrivers, to name a few, which have the durability and strength for use in industrial applications. It is a further object of the invention to provide a means for flotation in water which is both unobstructive and non-burdensome to the user of the hand tools and which does not detract from the aesthetic qualities of the tool.

In one aspect of the present invention, a non-conductive, non-corrosive floating hand pliers is constructed of two lever members, each having a handle end, a gripping end and pivot means operatively interconnecting the lever members intermediate the gripping end and the handle end. At least one of the lever members has an enclosed cavity capable of holding a fluid medium such as nitrogen gas, air, or a low density foam to reduce the overall density of the hand pliers. In another embodiment, a foam, such as polyethylene or chlorosulfanated polyethylene is used as a sheathing material which extends around at least one of the handles to reduce the overall density of the pliers. Additionally, in certain tool configurations, both cavity holding foam or gas may be used in combination with a low density sheathing material to decrease the overall density of the hand tool.

In another aspect of the present invention, the non-conductive floating pliers or channel locks are constructed of a reinforced plastic, fiberglass or similar synthetic material such as Verton® or Isoplast®. These materials provide exceptional strength and durability, yet have an overall lower density than metallic materials or other commonly used low density plastics without reinforcement.

In another aspect of the present invention, the hand pliers utilize a specific geometric shape, including a rigid "I-beam" which enhances the strength of the hand pliers. The I-beam is generally a substantially linear section extending from the pivot means towards the handle end of the pliers. The I-beam has opposing "cut-out" channels which result in reduced material requirements, lower weight and hence lower manufacturing costs, yet allow extreme pressure to be applied to the gripping member of the pliers without significant deflection in the handle end of the hand pliers.

It is a further object of the present invention to provide a sharpened edge or blade which can be used to cut fishing line, string or other similar items. Thus in one aspect of the present invention a line cutter is integrally molded into one of the handles. Alternatively the line cutter may be removably interconnected to one or more of the handles by elastic or rubber bands, twine, glue or other means. Finally, the line cutter may be incorporated into wear- resistant jaws positioned in operable relationship to the gripping surfaces of the pliers, or incorporated into the original plastic gripping ends of the pliers.

It is yet another object of the present invention to provide an improved jaw gripping surface which is more durable, resilient to wear and which increases the gripping force applied to an object being grasped. Thus, in one aspect of the present invention the jaw teeth are aligned to overlap wherein the teeth on one side of the gripping surface engage the "v" or cavity between the teeth on the opposing jaw gripping surface. This feature allows a greater force to be applied to an object by allowing each of the opposing jaw teeth to mate together. Thus, if a small object is grasped near the front of the slier jaws and a force is applied, the jaw teeth near the rear portion of the jaws will mate together, thus allowing a greater force to be applied to the object being grasped.

In an alternative embodiment of the present invention, a wear-resistant jaw insert may be positioned over the plastic gripping ends on each gripping surface to provide a durable surface which is highly resistant to wear. Preferably the wear-resistant laws are made of a metallic material such as stainless steel. These wear-resistant jaw inserts may be attached to the jaws with an adhesive, screws, wire or other means commonly known in the art. In a preferred embodiment the wear-resistant jaw inserts may incorporate a metal line cutter to facilitate the cutting of fishing line, twine, etc.

BRIEF DESCRIPTION OF THE DRAWINGS

FIG. 1 is a plan view of a hand held floating pliers with an enclosed gas cavity within the handle members of the pliers.

FIG. 2 is a plan view of a hand held floating pliers showing a low density sheathing material attached to the handle members of the pliers.

FIG. 3 is a cross-section of line 3—3 of FIGS. 1 and 2 showing the I-beam construction of the lever members.

DETAILED DESCRIPTION

Figure 4:
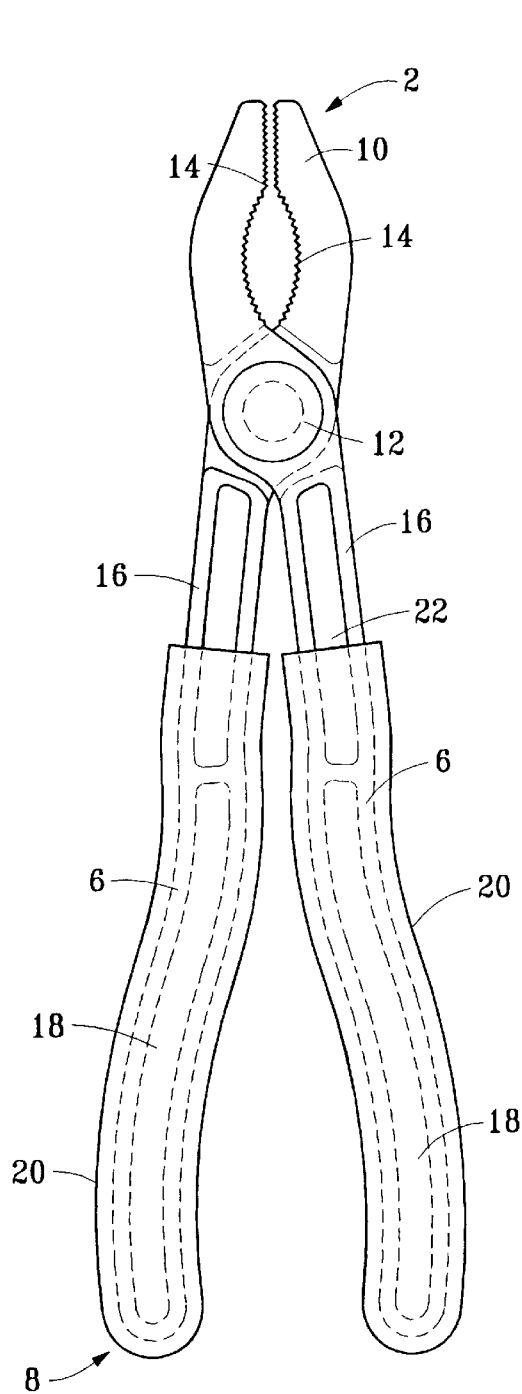
FIG. 4 is a plan view of an alternative embodiment of the hand held pliers of FIG. 1, showing a low density sheathing material used in combination with a gas cavity enclosed within the handle member of the pliers.
Figure 5:
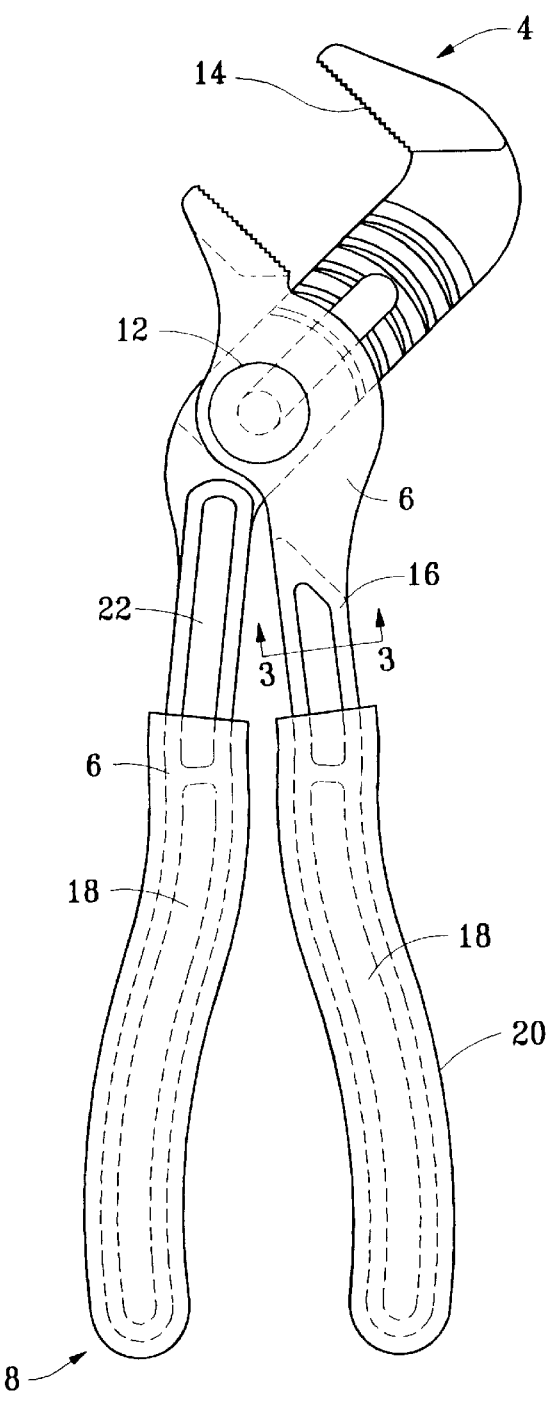
FIG. 5 is a plan view of floatable channel-lock type hand pliers with enclosed gas cavity within the handle members of the pliers.

Referring to FIG. 1, the apparatus constructed in accordance with an embodiment of the present invention is shown by reference numeral 2. An alternative embodiment of the present invention may be seen in FIG. 2. As shown, the apparatus generally comprises two lever members 6, a pivot pin 12, a handle end 8, a gripping end 10, and an enclosed cavity 18 capable of holding a fluid such as a gas or low density foam material. Alternatively, as seen in FIG. 2, a sheathing material 20 such as a low density foam material may be used to enclose all or a portion of the handle end 8 of the tool to reduce the overall density of the tool, thus permitting the hand tool to float.

Thus, in one embodiment of the present invention a lightweight, durable hand tool is provided which has a density low enough to permit the hand tool to float in water. Furthermore, the tool is made of non-conductive materials which significantly reduces the likelihood of a user being shocked or electrocuted when using the tool near or in contact with materials which can conduct electrical current.

Preferably, the hand tools are comprised of a synthetic material such as plastic or fiberglass or other similar light weight non-conductive materials. More preferably, the hand tools are constructed of a durable, lightweight, synthetic material such as Verton® or Isoplast®, which are trademarked materials developed by LNP Plastics and Dow Chemical Company, respectfully. These materials allow the pliers to be used in industrial type applications without significant wear to the gripping teeth 14 located on the gripping end 10 of the hand pliers 2. Further, these materials are extremely rigid, which allows significant force to be applied to an object within the gripping teeth 14 without any significant deflection in the handle end of the pliers.

Preferably, the hand tools are manufactured by an injection molding process. This process allows the hand tool to be manufactured with the aforementioned materials within a high degree of tolerance, but more importantly allows for the creation of a substantially non-permeable cavity 18 within one or more of the lever members 6 of the hand pliers 2. The cavity 18 may be filled with a gas such as carbon dioxide, oxygen, air helium or more preferably, nitrogen, which is readily available and generally inexpensive. Furthermore, the cavity 18 could be filled with a low density foam material such as hydrofoam®, polystyrene, polyethylene or other similar low density materials known in the art. The actual steps of manufacturing the hand tools with the cavity 18 will be described in greater detail below.

Figure 6:
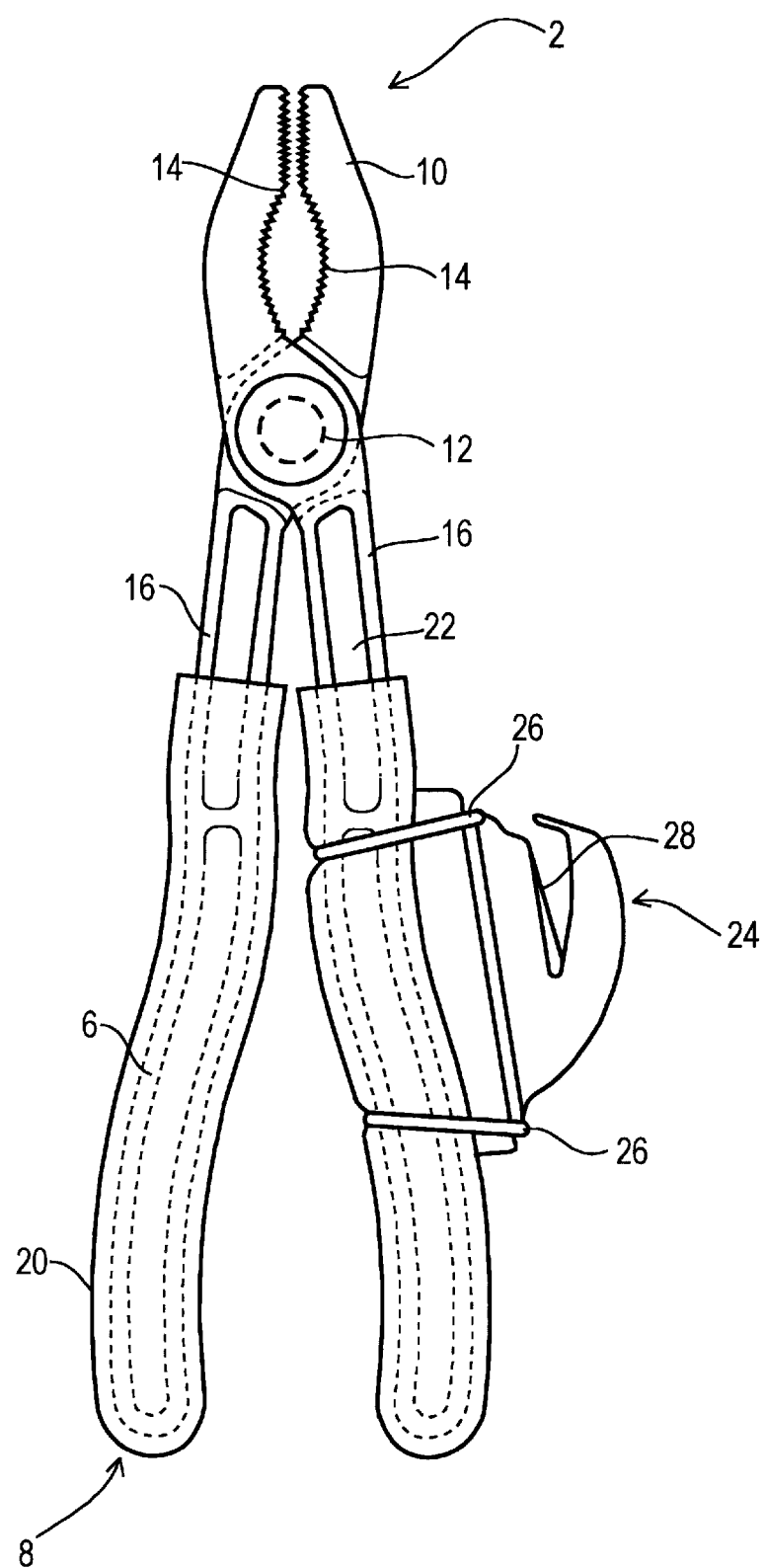
FIG. 6 is a plan view of the hand held floating pliers with line cutters interconnected to one of the handle members.

In another embodiment of the present invention, the hand tools are manufactured without an enclosed cavity, but rather utilize a low density sheathing material 20 such as hypalon, foam rubber, polystyrene, polyethylene or styrofoam® to reduce the overall density to allow the hand tool to float. The low density sheathing material 20 generally has a density of about 15 lbs./ft.$^3$, and more preferably 12 lbs./ft.$^3$. The foam material not only reduces the overall density of the hand tool, but also provides a cushioning effect which helps prevent hand fatigue and irritation after prolonged periods of use. As seen in FIG. 2, the low density sheathing material 20 generally extends around both handle ends 8 of the lever members 6, although depending on the overall density of the hand tool, it may be sufficient to encase only one handle end 8 of the hand pliers 2. Furthermore, depending on the overall density of the hand tool, a low density sheathing material 20 may be used in combination with a fluid cavity 18 as seen in FIG. 4. As seen in FIG. 6, the same type of fluid cavity 18 can be utilized in different tool configurations such as channel locks, screwdrivers, socket sets, etc. (not shown).

The lever members 6 of the hand pliers 2 or channel lock pliers are held together in a pivotable manner with a pivot pin 12. The pivot pin 12 is generally comprised of the same lightweight synthetic material as the durable lever members 6 of the hand pliers 2,which helps reduce the overall weight of the hand pliers 2. The pivot pin 12 is actually comprised of a male end and a female end which are operably engaged by the male end engaging the internal diameter of the female end, which has a slightly larger diameter. The male end and female ends of the pivot pin are generally interconnected by a resin or glue such as Loctite 300 series, Loctite 400 series or alternatively by a plastic ultrasonic or spin welding type process which prevents the two members from becoming disengaged.

In another embodiment of the present invention an "I-beam" geometric configuration is used which significantly enhances the strength of the hand pliers and reduces material costs during manufacturing. The I-beam 16 may generally be seen in FIGS. 1–6 and more specifically in FIG. 3, which is a cross section taken at line 3—3 in the aforementioned Figures.

The I-beam 16 construction is generally used on the upper one half of the handle ends 8 of the lever members 6 which are in close proximity to the pivot pin 12. The I-beam 16 provides exceptional strength and rigidity to the lever members 6 while reducing material costs. As seen in cross-section FIG. 3, the "I-beam" 16 is generally comprised of opposing channels 22 which are formed in the mold cavity during the manufacturing process. The I-beam channels effectively remove between about 20 and 30 percent of the materials used in a solid, rectangular or round cross-sectional configuration, thus reducing material costs.

Perhaps more importantly, the I-beam 16 configuration utilized in the lever members 6 has been found to provide exceptional strength. For example, in one embodiment of the hand held pliers shown in FIG. 2 and FIG. 3 which has an I-beam member with a cross-sectional thickness X of 0.5 inches, a Y dimension of 0.435 inches, and a Z dimension of 0.2 inches, a force of at least about 170 lbs. was applied across the entire gripping end 10 surface area of the hand pliers by applying a force of 80 lbs. to the handle ends 8 of pliers. With this applied force, the total deflection d (FIG. 2) between the handles of the pliers was 1.5 inches. Thus, each individual lever member 6 deflected a total distance of about 0.75 inches. As the thickness of the I-beam 16 increases, the deflection between the hand held pliers 2 gripping members decreases. For example, if the I-beam 16 X dimension is increased 0.025 inches and the Y dimension 0.025 inches, the stiffness of the lever members 6 is increased 25%. Thus, if the total force applied to the handle end 10 is again 80 lbs., the total maximum deflection d between the handle ends 10 of the lever members 8 is reduced to about 0.8625 inches (0.43 inches per lever member 6), as opposed to the 1.5 inches in the previous example. Thus, depending on the application, it is possible to construct lightweight, durable pliers with substantial strength depending on the thickness of the lever member 6 and "I-beam" 16.

Figure 7:
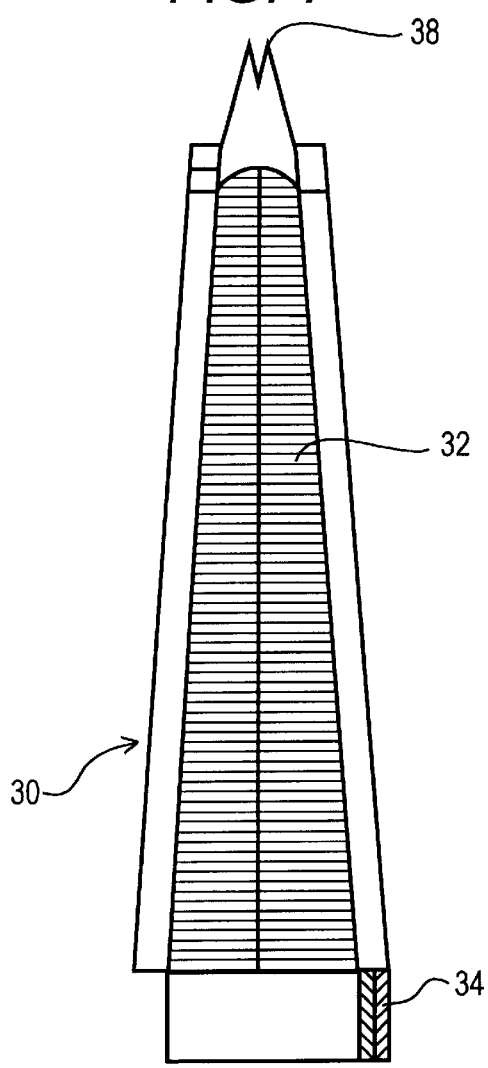
FIG. 7 is a to -plan view of one of the jaw members with interconnected metal jaw insert and line cutter.
Figure 8:
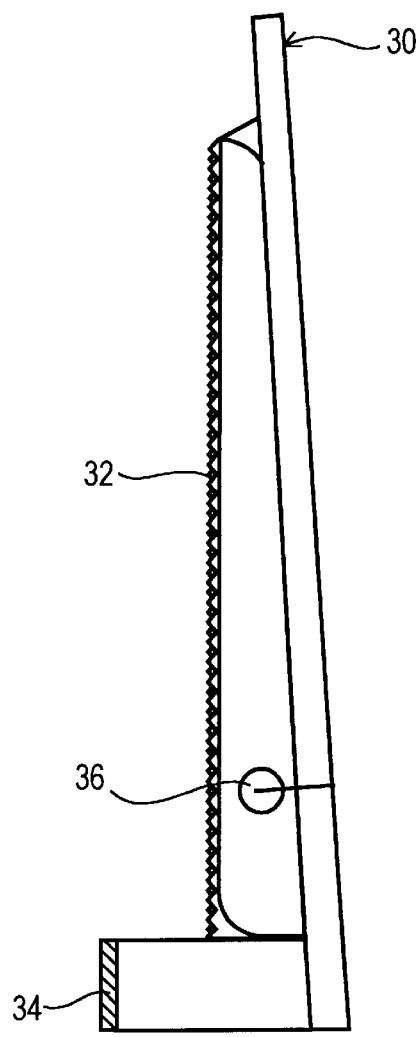
FIG. 8 is a side view of one of the jaw members with interconnected metal jaw insert and line cutter.
Figure 9:
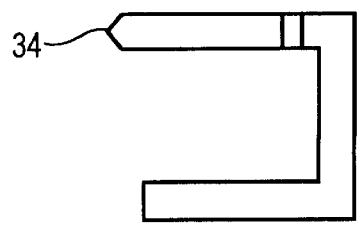
FIG. 9 is an end view of the metal jaw insert with interconnected line cutter.

In yet another aspect of the present invention the pliers 2 have a durable wear-resistant jaw insert 30 which is either permanently or temporarily positioned on the existing plastic gripping ends 10. Preferably the wear-resistant jaw insert is comprised of a metallic material such as stainless steel. The wear-resistant jaw insert embodiment is shown in FIGS. 7–9 and preferably has a plurality of serrated jaw teeth 32 to provide exceptional gripping qualities and in one embodiment may incorporate a line cutter 34 to facilitate the cutting of fishing line, twine or other similar materials. Additionally, a hook remover 38 may be positioned at the tip of the wear-resistant jaw inserts 30. The hook remover 30 is preferably "v" shaped to engage a fish hook or other similarly shaped device, although other geometric configurations may be utilized.

The wear-resistant jaw inserts 30 may be interconnected to the plastic gripping ends 10 of the pliers by the use of an aperture 36 which extends through the gripping ends 10 of the pliers or tool. A screw, bolts wire or other similar attachment mechanism is then placed through the Aperture 36 to attach the wear resistant jaw inserts 30 to the gripping ends 10. Alternatively, the wear-resistant gripping laws may be secured in place with adhesives or glues or be custom fit to engage a cutout slot or other configuration which is custom molded into the gripping ends 10 of the pliers. Whichever type of attachment mechanism is incorporated into the design, it is anticipated that the wear-resistant jaw inserts 30 can be attached either permanently or temporarily to the gripping ends 10 of the tool to provide a durable, replaceable gripping surface.

In yet another aspect of the present invention a line cutter 24 is provided which is attached to or integrally molded into one of the handles of the pliers 2. The line cutter 24 is generally comprised of a metallic cutting blade 28 surrounded by a plastic or wear-resistant housing for safety purposes. A narrow slot is provided to allow the insertion of fishing line, twine and other similar objects to engage the cutting blade 28. In one embodiment shown in FIG. 6, the line cutter 24 may be removably interconnected to the handle with elastic or rubber interconnection bands 26. Alternatively the line cutter 24 may be attached with adhesives, glues, screws or other similar attachment mechanisms. Alternatively a slot may be molded into the handles and sized to receive a pin or engagement stud or to engage a portion of the line cutter 24.

Figure 10:
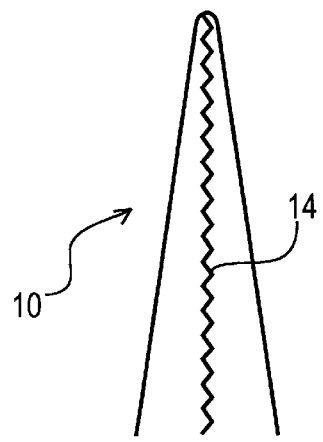
FIG. 10 is a front plan view of the pliers showing the opposing gripping teeth in a mating, closed position.

In yet another embodiment of the present invention shown in FIG. 10, the opposing teeth 14 used on the gripping surfaces are aligned to offset one another so each individual tooth is matinqly engaged between two opposing teeth on the opposite law. The configuration allows a greater gripping force to be applied to an object since when an object is grasped near the front of the gripping laws the gripping teeth 14 matinqly engage near the rear of the laws, thus allowing greater deflection in the jaws and a greater force to be applied to the object.

The foregoing description of the present invention has been presented for purposes of illustration and description.

The description is not intended to limit the invention to the form disclosed herein. Consequently, the inventions and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention, it is intended that the appended claims be construed to include all alternative embodiments as permitted by the prior art.

Furthermore, for purposes of illustration and clarity, the following component numbering is provided which corresponds with the attached drawings herein:

| | |
|---|---|
| 02 | hand pliers |
| 04 | channel lock pliers |
| 06 | lever member |
| 08 | handle end |
| 10 | gripping end |
| 12 | pivot pin |
| 14 | gripping teeth |
| 16 | I-beam |
| 18 | fluid cavity |
| 20 | low density sheathing material |
| 22 | I-beam channels |
| 24 | line cutter |
| 26 | line cutter interconnection bands |
| 28 | line cutter blade |
| 30 | wear-resistant jaw insert |
| 32 | wear-resistant jaw insert teeth |
| 34 | wear-resistant jaw line cutter |
| 36 | wear-resistant jaw aperture |
| 38 | hook remover |

What is claimed is:

1. A lightweight, substantially non-corrosive hand pliers, comprising:

two non-metallic lever members each having a handle, end, a gripping end and pivot means operatively interconnecting said lever members between said gripping ends and said handle ends;

a low density sheathing material substantially enclosing said handle end of at least one of said lever members, wherein said pliers has a density less than water and a non-obstructed range of motion between a first open position with said gripping ends of said lever members in a spaced apart relationship and a second closed position with said gripping ends of said lever members in operable contact with one another; and a wear-resistant jaw removably interconnected to each of said gripping ends, said wear-resistant jaw having a plurality of teeth which are adapted for frictional engagement to grasp an object.

2. The lightweight hand pliers of claim 1, wherein said wear-resistant jaws are comprised of a metallic-material.

3. The lightweight hand pliers of claim 2, further comprising line cutters interconnected to one of said handle ends of said pliers.

4. The lightweight hand pliers of claim 3, wherein said line cutters are interconnected to said handle ends with a stretchable band.

5. The lightweight hand pliers of claim 3, wherein said line cutters are interconnected to said handle ends with an adhesive.

6. The lightweight hand pliers of claim 1, wherein said wear resistant jaws are comprised of fiberglass.

7. The lightweight hand pliers of claim 1, wherein said wear resistant jaws have a line cutter interconnected thereto.

8. The lightweight hand pliers of claim 1, wherein said wear resistant jaws further comprise a fish hook remover interconnected thereto.

9. The lightweight hand pliers of claim 1, wherein said wear resistant jaws further comprise a plurality of teeth which are matingly engaged to said teeth on an opposing set of wear resistant jaws.

10. The lightweight land pliers of claim 1, further comprising a cavity positioned within one of said non-metallic lever members which is capable of holding a low density gas to reduce the overall density of said hand pliers.

11. A lightweight, substantially non-conductive non-corrosive hand pliers, comprising:

two non-metallic lever members each having a handle, end, a gripping end and pivot means operatively interconnecting said lever members between said gripping ends and said handle ends; and a low density sheathing material substantially enclosing said handle end of at least one of said lever members, wherein said pliers has a density less than water and a non-obstructed range of motion between a first open position with said- gripping ends of said lever members in a spaced apart relationship and a second closed position with said gripping ends of said lever members in operable contact with one another; and a line cutter interconnected to one of said non-metallic lever members which is adapted for cutting fishing line.

12. The hand pliers of claim 11, further comprising a wear resistant jaw removably interconnected to each of said gripping ends, said wear resistant jaws having a plurality of teeth adapted for frictionally engaging an object.

13. The hand pliers of claim 12, wherein said wear resistant jaws are comprised of a metallic material.

14. The hand pliers of claim 11, further comprising a cavity positioned within one of said non-metallic lever members which is capable of holding a low density gas to reduce the overall density of said hand pliers.

15. The hand pliers of claim 11, wherein said gripping ends have a plurality of opposing teeth which matingly engage one another when said gripping ends are in operable contact with one another.

16. A floating, substantially non-conductive hand tool, comprising:

a body portion and a tool portion, said body portion having a first end, a second end, and an exterior surface, at least one of said ends having attachment means for interconnection to said tool portion, said body portion having a low density sheathing material substantially enclosing at least a portion of said body portion, wherein said non-conductive hand tool has a density less than water and a non-obstructed range of motion between a first open position with a gripping end of said body portion in a spread-apart relationship and a second closed position said gripping ends in operable contact with one another; and a wear resistant jaw insert positioned over at least a portion of said tool portion.

17. The hand tool of claim 16, wherein said hand tool is a channel lock.

18. The hand tool of claim 16, wherein said wear resistant jaw is positioned over said gripping ends of said tool.

19. The hand tool of claim 16, further comprising a line cutter adapted for cutting fishing line which is interconnected to said body portion.

20. The hand tool of claim 16, wherein said wear resistant jaw is comprised of a metallic material.

* * * * *